US008564765B2

(12) United States Patent
Kuo

(10) Patent No.: US 8,564,765 B2
(45) Date of Patent: Oct. 22, 2013

(54) OPTICAL MEASUREMENT SYSTEM

(75) Inventor: Hung-Pin Kuo, Taichung (TW)

(73) Assignee: B&M Optics Co., Ltd., Taichung (TW)

( * ) Notice: Subject to any disclaimer, the term of this patent is extended or adjusted under 35 U.S.C. 154(b) by 132 days.

(21) Appl. No.: 13/228,831

(22) Filed: Sep. 9, 2011

(65) Prior Publication Data

US 2012/0081700 A1    Apr. 5, 2012

(30) Foreign Application Priority Data

Oct. 1, 2010 (TW) .................. 99133620 A

(51) Int. Cl.
*G01J 1/60* (2006.01)
*G01J 1/42* (2006.01)
(52) U.S. Cl.
CPC .......................................... *G01J 1/42* (2013.01)
USPC ......................................... 356/213; 356/222
(58) Field of Classification Search
CPC ........................................................ G01J 1/42
USPC .................. 356/213–222, 614–624
See application file for complete search history.

(56) References Cited

U.S. PATENT DOCUMENTS

| 5,112,126 | A | * | 5/1992 | Graebner | ................... | 356/141.5 |
| 5,253,036 | A | * | 10/1993 | Ashdown | ...................... | 356/121 |
| 5,663,798 | A | * | 9/1997 | Karrai | ........................... | 356/635 |
| 6,639,672 | B2 | * | 10/2003 | Haavig et al. | ................. | 356/338 |
| 2002/0186372 | A1 | * | 12/2002 | Haavig et al. | ................. | 356/338 |
| 2006/0023222 | A1 | * | 2/2006 | Binder et al. | ................. | 356/446 |
| 2009/0185173 | A1 | * | 7/2009 | Ashdown et al. | ............ | 356/121 |

FOREIGN PATENT DOCUMENTS

TW        M365473        9/2009

* cited by examiner

*Primary Examiner* — Michael P Stafira
(74) *Attorney, Agent, or Firm* — Muncy, Geissler, Olds & Lowe, PLLC

(57) ABSTRACT

An optical measurement system includes a holder, a bracket, a plurality of optical sensors, a motor and a processing unit. The holder is provided for holding a test light source at the origin of a spherical coordinate system. The optical sensors are located on the bracket at different elevation angles with respect to the origin. Moreover, the optical sensors are spaced the same radial distance apart from the origin to aim at the test light source. The motor is configured to drive either the holder or the bracket to rotate such that the test light source at the origin is able to relatively rotate with respect to the optical sensors about a zenith axis of the spherical coordinate system. The processing unit is coupled to the optical sensors for processing of data captured from the optical sensors.

8 Claims, 5 Drawing Sheets

OPTICAL MEASUREMENT SYSTEM

BACKGROUND OF INVENTION

1. Field of Invention

This invention relates to an optical measurement system and more particularly to a goniophotometer which is useful for characterizing the luminous intensity or illuminance distribution of a light source such as LED in a space-saving and effective manner.

2. Related Prior Art

Spatial luminous intensity distribution, which can be accurately measured by a goniophotometer, is an important parameter for lamps or luminaries. A photometer head can be rotated around a test light source to measure the luminous intensity of the light source in different spatial angles. Performing such measurement in each spatial angle, however, takes a significant amount of time to perform.

As disclosed in Taiwan Patent No. M365473, another type of goniophotometer is configured to pose a test light source in different positions with respect to a stationary photometer head in order to measure the luminous intensity of the light source in different spatial angles. Likewise, performing such measurement for each pose of the light source, however, takes a significant amount of time to perform. Moreover, the whole measurement system requires lots of space to have the test light source be posed in different positions.

Accordingly, it would be desirable to provide a reliable, space-saving and effective system for measurement of the luminous intensity distribution of the light source.

SUMMARY OF INVENTION

To overcomes the limitations of the prior art, an optical measurement system is employed for characterizing a luminous intensity distribution of a light source in accordance with one embodiment. The system includes a holder for holding a test light source, a bracket, a plurality of optical sensors mounted on the bracket, a motor and a processing unit. The test light source is held at the origin of a spherical coordinate system. The optical sensors are located at different elevation angles with respect to the origin, spaced the same radial distance apart from the origin, and aimed at the test light source. The motor is configured to drive the holder to rotate with respect to the bracket such that the test light source at the origin is able to relatively rotate with respect to the optical sensors about a zenith axis of the spherical coordinate system. The processing unit is coupled to the optical sensors for processing of data captured from the optical sensors. In this way, the light source will be rotated with the holder, and each of the stationary optical sensors at its elevation angle can collect the light of the light source from different azimuth angles. This makes the measurement system to produce a three-dimensional luminous intensity distribution curve of a light source in a space-saving and effective manner.

Alternatively, the motor may be arranged to rotate the bracket rather than the holder. In this way, the test light source at the origin can still be able to relatively rotate with respect to the optical sensors about a zenith axis of the spherical coordinate system.

In accordance with another embodiment, an optical measurement system is employed for measuring an illuminance distribution on a predetermined plane irradiated by a light source. Similarly, the system includes a holder, a bracket, a plurality of optical sensors, a motor and a processing unit. The holder is provided for holding a test light source at the origin of a spherical coordinate system. The optical sensors are located in a straight line on the bracket at different elevation angles with respect to the origin, and each is aimed at the test light source. The motor is configured to drive the holder to rotate with respect to the bracket such that the test light source at the origin is able to relatively rotate with respect to the optical sensors about a zenith axis of the spherical coordinate system. The processing unit is coupled to the optical sensors for processing of the data captured from the optical sensors. In this way, when the light source is rotated with the holder, each of the stationary optical sensors at its elevation angle can collect light from different azimuth angles. Thus, a three-dimensional illuminance distribution of the light source can be measured in a space-saving and effective manner.

Alternatively, the motor may be arranged to rotate the bracket rather than the holder. In this way, the test light source at the origin can still be able to relatively rotate with respect to the optical sensors about a zenith axis of the spherical coordinate system.

Further features and advantages of the present invention will be appreciated by review of the following detailed description of the invention.

BRIEF DESCRIPTION OF DRAWINGS

The invention is illustrated by the accompanying drawings in which corresponding parts are identified by the same numerals and in which.

DETAILED DESCRIPTION OF EMBODIMENTS

Figure 1:
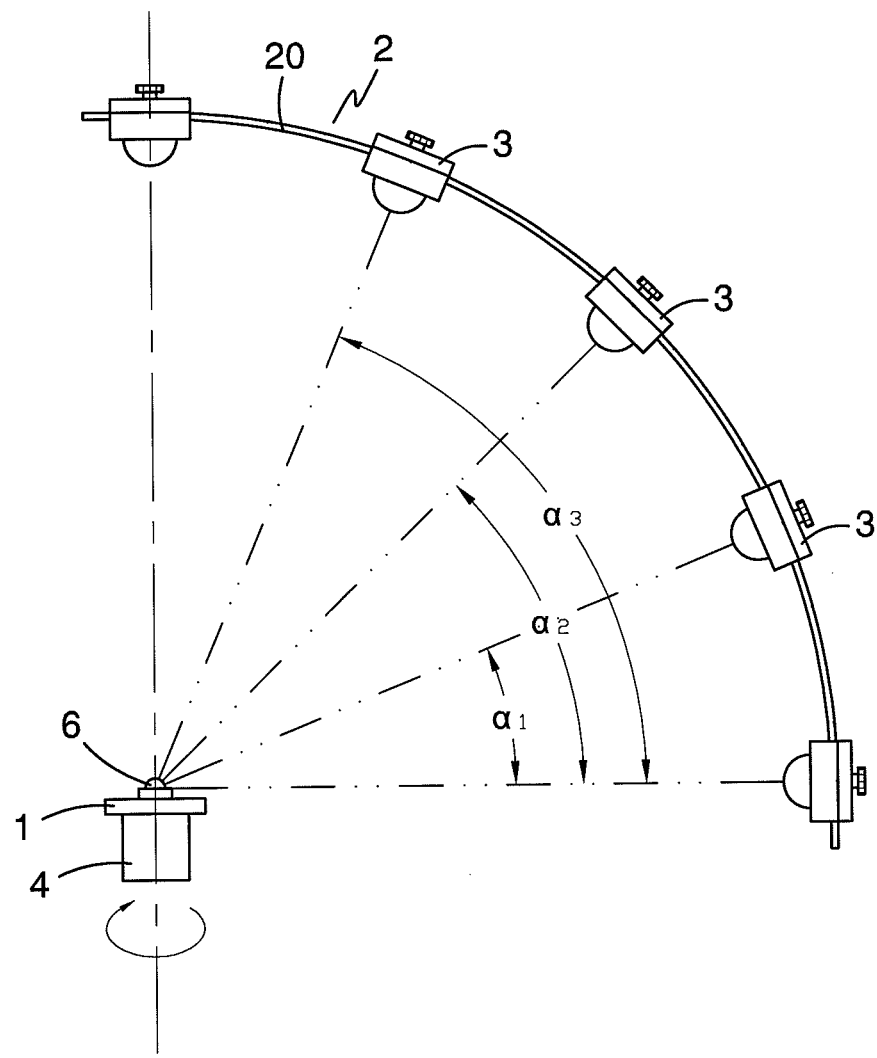
FIG. 1 is a cross-sectional view of an optical measurement system in accordance with a first embodiment of the present invention.
Figure 2:
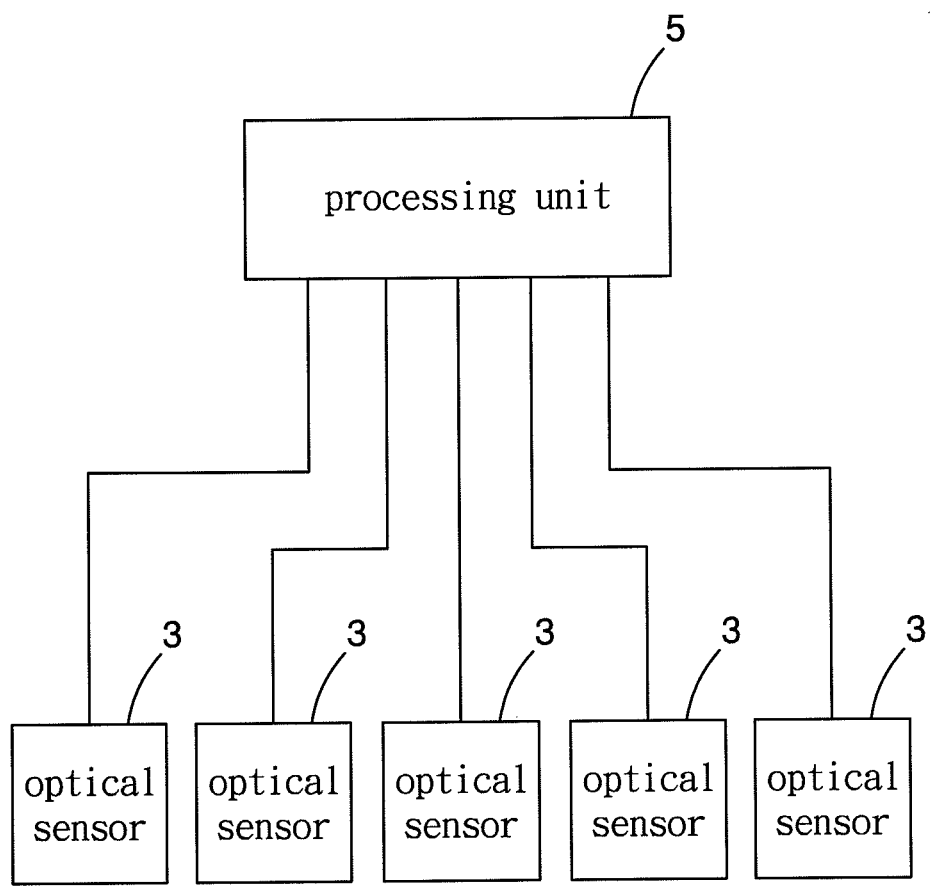
FIG. 2 is a block diagram illustrating the relationship among a processing unit and associated optical sensors of the optical measurement according to the invention.

Referring now to FIG. 1, there is illustrated an optical measurement system 100, namely a luminous intensity distribution meter, constructed in accordance with a first embodiment of the present invention. The system 100 includes a holder 1, a bracket 2, a plurality of optical sensors 3, a motor 4 and a processing unit 5 (FIG. 2).

The holder 1 is provided to hold a test light source, such as a LED, at the origin of a spherical coordinate system. The optical sensors 3 are aimed at the test light source 6 and arranged in order along an arc-shaped frame 20 of the bracket 2, as depicted in FIG. 1. In particular, the arc center of the frame 20 and the origin of the spherical coordinate system meet at the same point where the test light source 6 is located. This ensures that the optical sensors 3 are located at different elevation angles 0, $\alpha 1$, $\alpha 2$, $\alpha 3$ and 90 degrees with respect to the origin, and spaced the same radial distance apart from the origin. Moreover, each of the optical sensors 3 is coupled to the processing unit 5, as shown in FIG. 2. The processing unit 5 is configured for processing of the data captured from the optical sensors 3 so as to produce a luminous intensity distribution curve of the light source.

The motor 4, such as an azimuth stepper motor, is connected to the holder 1 and configured to drive the holder 1 to rotate with respect to the bracket 2 such that the test light source 6 at the origin is able to relatively rotate with respect to the optical sensors 3 about a zenith axis of the spherical coordinate system, as indicated by an arrow in FIG. 1. In this way, the test light source 6 will rotate with the holder 1, and each of the optical sensors 3, standing still at its elevation angle, can collect the light of the test light source 6 from different azimuth angles. The processing unit 5 then converts the captured data into luminous intensity values, for example. Thus, a three-dimensional luminous intensity distribution curve of the light source can be made in a space-saving and effective manner.

Preferably, the arc-shaped frame 20 of the bracket 2 is a slide rail such that the optical sensors 3 which are arranged on the frame 20 may be easily adjusted to collet light at desired elevation angles. Actual quantity of the optical sensors 3 depends upon requirements and may be more or less than five as shown in FIG. 1.

Figure 3:
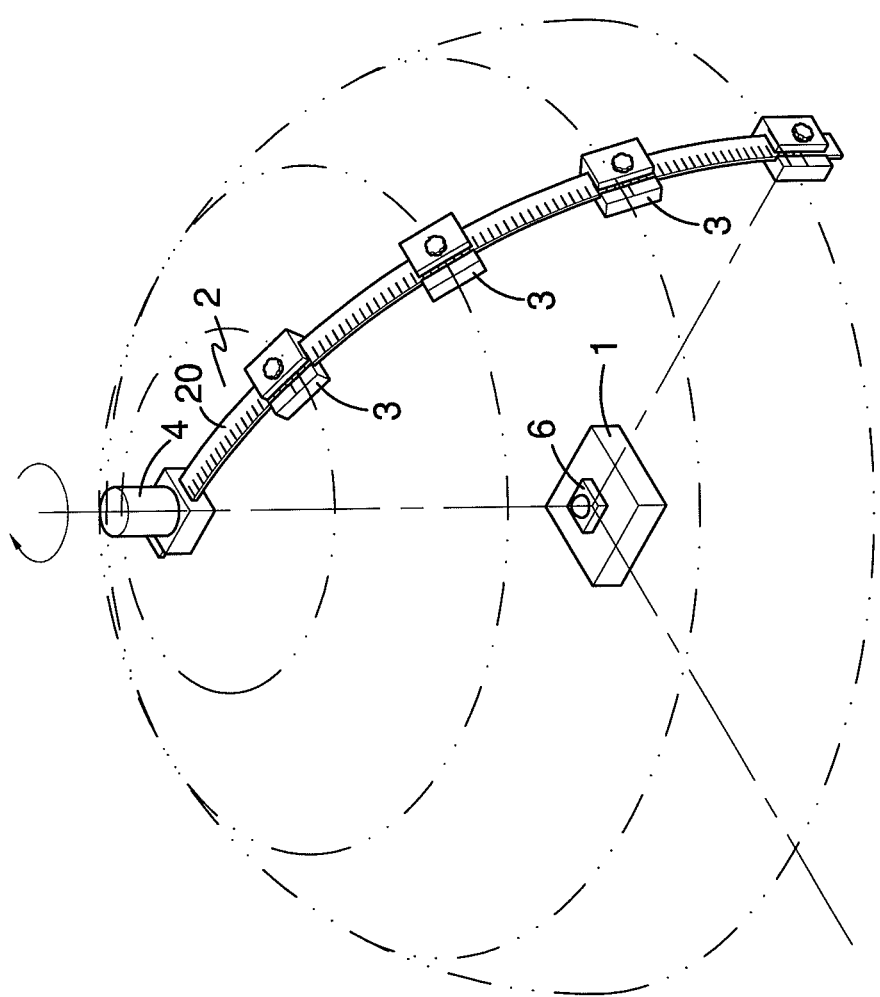
FIG. 3 is a perspective view of an optical measurement system in accordance with a second embodiment of the present invention.

FIG. 3 illustrates another optical measurement system 200 constructed in accordance with a second embodiment of the present invention. As with the system 100 of FIG. 1, the optical measurement system 200 includes a holder 1, a bracket 2, a plurality of optical sensors 3, a motor 4 and a processing unit 5, except that the motor 4 is connected to the bracket 2 rather than the holder 1. Thus, in this embodiment, the holder 1 on which the test light source 6 is located is stationary; and the motor 4, on top of the bracket 2, is configured to drive the bracket 2 to rotate at the same angular velocity with respect to the holder 1. In this way, the test light source 6 at the origin is still able to relatively rotate with respect to the optical sensors 3 about a zenith axis of the spherical coordinate system, as indicated by an arrow in FIG. 3.

Specifically, as shown in FIG. 3, the test light source 6 is located on the holder 1 and held at the origin of a spherical coordinate system. The optical sensors 3 are aimed at the test light source 6 and arranged in order along an arc-shaped frame 20 of the bracket 2. In particular, the arc center of the frame 20 and the origin of the spherical coordinate system meet at the same point where the test light source 6 is located. This ensures that the optical sensors 3 are located at different elevation angles with respect to the origin, and spaced the same radial distance apart from the origin. Preferably, the arc-shaped frame 20 of the bracket 2 is a slide rail, as shown in FIG. 3, such that the optical sensors 3 which are arranged on the frame 20 may be easily adjusted to collet light at desired elevation angles. Moreover, each of the optical sensors 3 is coupled to the processing unit 5, as shown in FIG. 2.

As such, the test light source 6 is stationary and the optical sensors 3 are rotated along altitude lines, as shown in phantom lines in FIG. 3, to collect the light of the test light source 6 from different azimuth angles. The processing unit 5 then converts the data captured from the optical sensors into luminous intensity values, for example. Thus, a three-dimensional luminous intensity distribution of the light source can also be measured in an effective manner.

Figure 4:
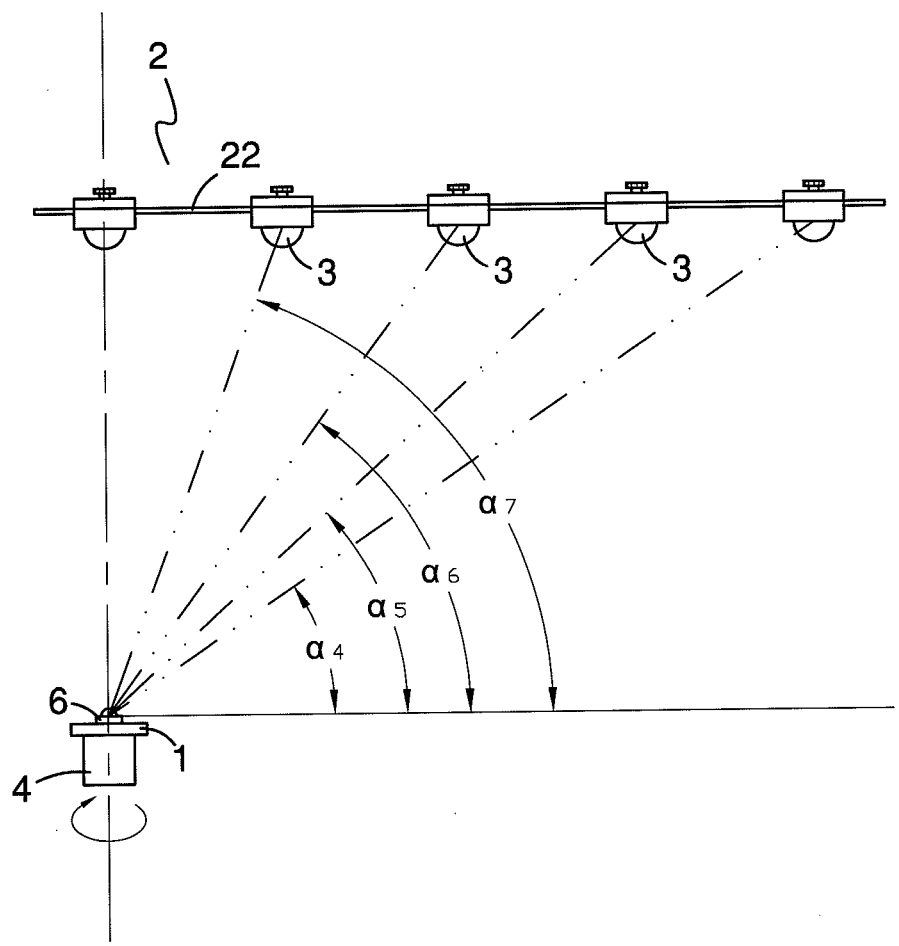
FIG. 4 is a cross-sectional view of an optical measurement system in accordance with a third embodiment of the present invention.

With reference to FIG. 4, there is shown an illustration of an optical measurement system 300 in accordance with a third embodiment of the present invention. Similar to the aforementioned system 100 or 200, the optical measurement system 300 includes a holder 1, a bracket 2, a plurality of optical sensors 3, a motor 4 and a processing unit 5 (FIG. 2). The main difference is that this optical measurement system 300 is typically provided to measure an illuminance distribution over a predetermined plane irradiated by a light source.

As shown in FIG. 4, the holder 1 holds the test light source 6 at the origin of a spherical coordinate system (not shown). The optical sensors 3 are located in a straight line on a linear slide rail 22 of the bracket 2 at different elevation angles $\alpha 4$, $\alpha 5$, $\alpha 6$, $\alpha 7$ and 90 degrees with respect to the origin and each aimed at the test light source 6. The linear slide rail 22 is used to facilitate adjustment of the location of the optical sensors 3. Moreover, each of the optical sensors 3 is coupled to the processing unit 5, as shown in FIG. 2.

Further, the motor 4, such as an azimuth stepper motor, is connected to the holder 1 and configured to drive the holder 1 to rotate with respect to the bracket 2 such that the test light source 6 on the holder 1 is able to relatively rotate with respect to the optical sensors 3 about a zenith axis of the spherical coordinate system, as indicated by an arrow in FIG. 4. In this way, the test light source 6 will rotate with the holder 1, and each of the optical sensors 3, standing still at its elevation angle, can collect the light of the test light source 6 from different azimuth angles. The processing unit 5 then converts the data captured from the optical sensors 3 into illuminance values, for example. Thus, a three-dimensional illuminance distribution over a predetermined plane irradiated by the light source 6 can be measured in a space-saving and effective manner.

Figure 5:
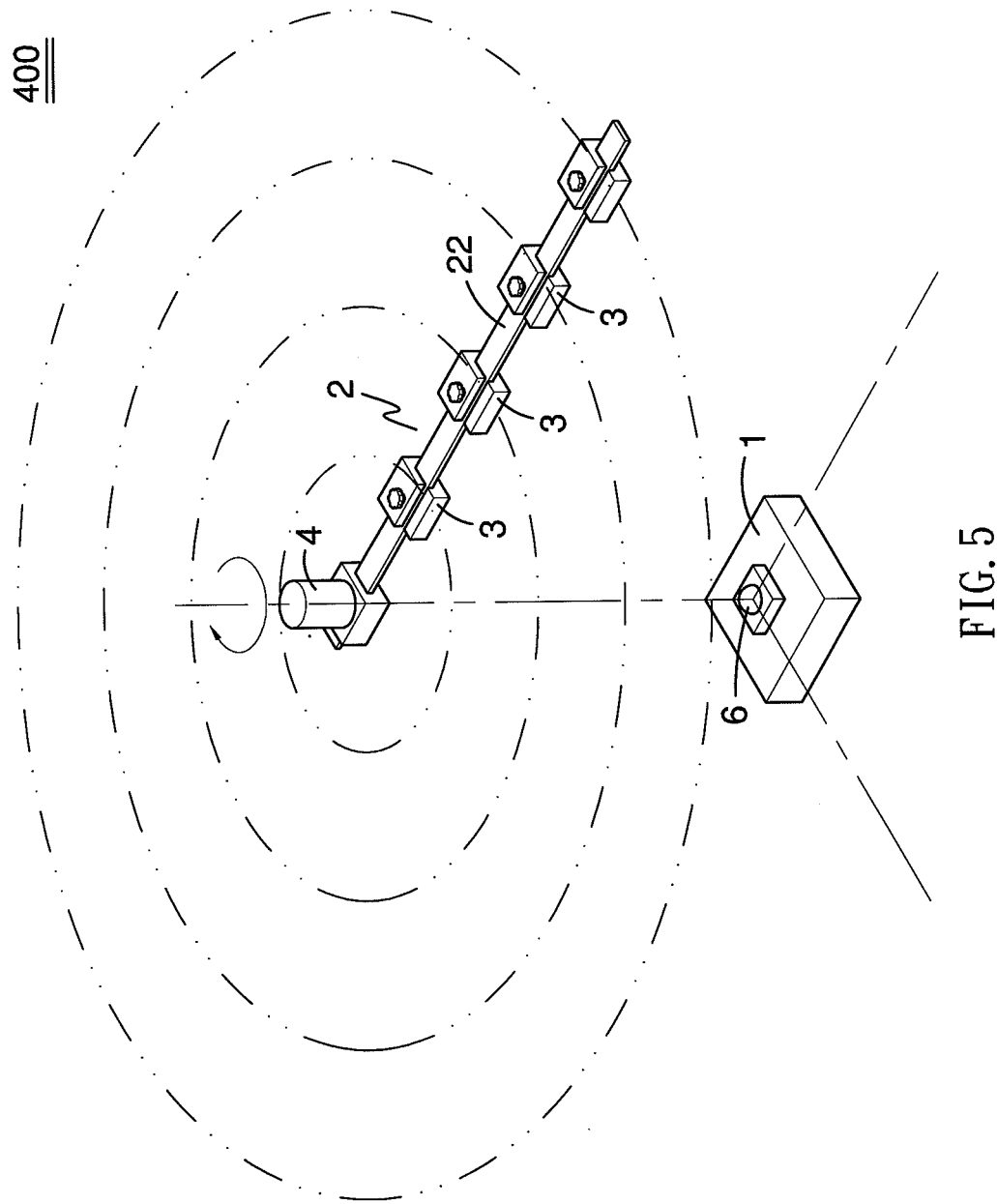
FIG. 5 is a perspective view of an optical measurement system in accordance with a fourth embodiment of the present invention.

FIG. 5 illustrates another optical measurement system 400 constructed in accordance with a fourth embodiment of the present invention. As with the system 300 of FIG. 4, the optical measurement system 400 is also provided for measurement of illuminance distribution, and includes a holder 1, a bracket 2, a plurality of optical sensors 3, a motor 4 and a processing unit 5, except that the motor 4 is connected to the bracket 2 rather than the holder 1. Thus, in this embodiment, the holder 1 on which the test light source 6 is placed is stationary; and the motor 4, on top of the bracket 2, is configured to drive the bracket 2 to rotate at the same angular velocity with respect to the holder 1 such that, the test light source 6 on the holder 1 is able to relatively rotate with respect to the optical sensors 3 about a zenith axis of the spherical coordinate system, as indicated by an arrow in FIG. 5.

Specifically, as shown in FIG. 5, the test light source 6 is located on the holder 1 and held at the origin of a spherical coordinate system (not shown). The optical sensors 3 are located in a straight line on a linear slide rail 22 of the bracket 2 at different elevation angles with respect to the origin or the test light source 6, and each aimed at the test light source 6. Moreover, each of the optical sensors 3 is coupled to the processing unit 5, as shown in FIG. 2.

In this way, the test light source 6 is stationary and the optical sensors 3 are rotated in the same plane at constant elevation angles, as shown in phantom lines in FIG. 5, to collect the light of the test light source 6 from different azimuth angles. The processing unit 5 then converts the data captured from the optical sensors 3 into illuminance values, for example. Thus, a three-dimensional illuminance distribution over a predetermined plane irradiated by the light source 6 can be measured in an effective manner.

It will be appreciated that although a particular embodiment of the invention has been shown and described, modifications may be made. It is intended in the claims to cover such modifications which come within the spirit and scope of the invention.

The invention claimed is:

1. An optical measurement system, comprising:
a holder, having a rotating axis extending in a zenith axis of a spherical coordinate system and being capable of rotating about the rotating axis, the holder supporting a test light source positioned on a surface of the holder at an origin of the spherical coordinate system;

a bracket;

a plurality of optical sensors located in an arc line on the bracket, each of the optical sensors located at different elevation angles measured from a plane that contains the origin and is perpendicular to the zenith axis of the spherical coordinate system, the optical sensors spaced the same radial distance apart from the origin, and aimed at the test light source;

a motor configured to drive the holder to rotate such that the test light source at the origin is able to relatively rotate with respect to the optical sensors about the zenith axis of the spherical coordinate system; and a processing unit coupled to the optical sensors for processing of data captured from the optical sensors.

2. The optical measurement system of claim 1, wherein the bracket includes a frame in an arc shape with the origin at the arc center of the frame, and the optical sensors are arranged in series on the frame.

3. The optical measurement system of claim 2, wherein the arc-shaped frame is a slide rail on which the optical sensors are mounted in an adjustable manner.

4. An optical measurement system, comprising:

a holder for holding a test light source at the origin of a spherical coordinate system;

a bracket;

a plurality of optical sensors located in a straight line on the bracket at different elevation angles with respect to the origin, and each aimed at the test light source;

a motor configured to drive either the holder or the bracket to rotate such that the test light source at the origin is able to relatively rotate with respect to the optical sensors about a zenith axis of the spherical coordinate system; and a processing unit coupled to the optical sensors for processing of data captured from the optical sensors.

5. The optical measurement system of claim 4, wherein the bracket include a linear slide rail on which the optical sensors are mounted in an adjustable manner.

6. An optical measurement system, comprising:

a holder, supporting a test light source positioned on a surface of the holder at an origin of a spherical coordinate system;

a bracket, having a rotating axis extending in a zenith axis of the spherical coordinate system and being capable of rotating around the rotating axis;

a plurality of optical sensors located in an arc line on the bracket, each of the optical sensors located at different elevation angles measured from a plane that contains the origin and is perpendicular to the zenith axis of the spherical coordinate system, the optical sensors spaced the same radial distance apart from the origin, and aimed at the test light source;

a motor configured to drive the bracket to rotate such that the test light source at the origin is able to relatively rotate with respect to the optical sensors about the zenith axis of the spherical coordinate system; and a processing unit coupled to the optical sensors for processing of data captured from the optical sensors.

7. The optical measurement system of claim 6, wherein the bracket includes a frame in an arc shape with the origin at the arc center of the frame, and the optical sensors are arranged in series on the frame.

8. The optical measurement system of claim 7, wherein the arc-shaped frame is a slide rail on which the optical sensors are mounted in an adjustable manner.

* * * * *